United States Patent Office 3,211,715

Patented Oct. 12, 1965

1

3,211,715

PROCESS FOR IMPROVING THE MECHANICAL PROPERTIES OF POLYMERS AND RESULTANT PRODUCTS

Hendrik Hendriks and Cornelis E. P. V. van den Berg, Geleen, Netherlands, assignors to Stamicarbon N.V., Heerlen, Netherlands No Drawing. Filed Jan. 24, 1961, Ser. No. 84,497
Claims priority, application Netherlands, Jan. 29, 1960, 247,903
6 Claims. (Cl. 260—94.9)

The present invention relates to a process for improving the mechanical properties of polymers derived from monomers containing only one double bond, e.g., ethylene, propylene, n-butylene, etc. (homopolymers), or polymers derived from mixtures of such monomers (random-copolymers). The invention further comprehends the novel products resulting from said process.

In the preparation of these polymers, use can be made of the so-called Ziegler catalysts. It is also possible to make use of a catalyst containing chromium oxide on a carrier, as has been described in Dutch patent application No. 188,403, or, for example, of a catalyst containing molybdenum oxide on a carrier, as has been described in Dutch patent application No. 168,346.

Generally, the mechanical properties of these polymers, e.g., the impact strength and the so-called elongation at rupture, do not come up to the demands made of them. This applies, in particular, to polyethylene prepared by means of Ziegler catalysts which, during the polymerization, contain not only trivalent but also tetravalent titanium. In general, such polymers have an inherent viscosity (measured at 135° C. in decalin, at a concentration of 100 mg. per litre) less than 4. However, the mechanical properties of other polymers also are sometimes unsatisafctory.

The object of the present invention is to provide a process by which it is possible to improve the mechanical properties of polymers constituted of monomers containing only one double bond. A particular object of the invention is to provide a process by which it is possible to improve the mechanical properties of so-called Ziegler polyethylene with an inherent viscosity, as defined above, of less than 4. Furthermore, there is proposed herein a simple modification of the so-called Ziegler polymerization, which is easy to carry out on a technical scale and by which there can be obtained polymers with improved mechanical properties. Other advantages of the invention will be mentioned hereinafter.

The process according to the invention for improving the mechanical properties of polymers derived from monomers containing only one double bond, is characterized in that an active Ziegler catalyst is made to act, in the absence of monomers, on a suspension or a solution of the polymer in a liquid vehicle.

The vehicle can be a saturated hydrocarbon, such as hexane, heptane, or cyclohexane. Use can also be made of other vehicles, such gasolene, kerosine, benzene, toluene, and halogenated hydrocarbons, such as chlorobenzene.

By the term "Ziegler catalysts" as used in the present specification and in the appended claims, are meant catalysts which are capable of effecting the polymerization of ethylene at atmospheric pressure to a product solid at room temperature, and which catalysts have been prepared by adding together at least one compound of a metal of the 4th up to and including the 8th Groups of the Periodic System, including thorium and uranium, and a metal, an alloy, a metal hydride, or an organo-metallic compound of the 1st up to and including the 3rd Groups

2 of the Periodic System, if desired, in the presence of other substances, such as aluminum chloride.

By an "active Ziegler catalyst" is to be understood a Ziegler catalyst which is not spent, hence, a catalyst which in the presence of a monomer, such as ethylene, causes a rise in temperature under adiabatic conditions.

The improvement of the mechanical properties is obtained when an active Ziegler catalyst acts on the polymer in the absence of the monomer. This does not imply that the monomer should be absent initially. Any monomer initially present is polymerized under the influence of the Ziegler catalyst, so that all or practically all of the monomer disappears. After this, there takes place the action of the Ziegler catalyst on the polymer, the action which is so favorable to the mechanical properties.

The temperature at which the action takes place can be varied within very wide limits. At room temperature, however, the period required for the action is so long that this operation becomes technically unattractive. If a suspension of the polymer be used at the start, the use of temperatures above 100° C. involves the drawback that the polymer will swell in the vehicle. Preferably, therefore, the action is made to proceed for more than two (2) minutes at a temperature from 60–100° C. It is advantageous to have it proceed at temperatures between 70 and 90° C., for a period of from four (4) to sixty (60) minutes. The action can be continued for a longer time, but this effects any, or hardly any, further improvement of the mechanical properties.

To obtain Ziegler polymers with improved mechanical properties, the process according to the invention can simply be applied to the suspension obtained in the polymerization. This can be done by adding to this suspension an active Ziegler catalyst or, if only one of the catalyst components is spent, adding only this component.

Preferably, however, the polymerization is effected by means of such an amount of Ziegler catalyst that, after termination of the polymerization, the resulting suspension still contains an active Ziegler catalyst. Subsequently, this suspension is kept at the desired temperature for the desired period, generally at a temperature slightly higher than that used for carrying out the polymerization. Thereafter, the catalyst is deactivated, preferably, by adding an alcohol to the suspension at the desired moment and in the usual way.

By the application of this simple modification of the well-known continuous or discontinuous Ziegler polymerization, and by the use of slightly more catalyst than is strictly necessary for this polymerization, polymers are obtained which have considerably better mechanical properties. The process according to the invention can also be carried out by temporarily interrupting the addition of the monomer or the monomers to the suspension, or to a part thereof during the polymerization.

It is particularly advantageous to apply the process according to the invention to Ziegler polyethylene having an inherent viscosity, as defined above, of less than 4. This polymer can be obtained by carrying out the polymerization in the presence of tetravalent titanium, e.g., in the presence of 20, 50, 100 mole percent or more of tetravalent titanium relative to trivalent titanium. Further it is remarkable that the greatest improvement in mechanical properties is obtained if the Ziegler catalyst acting on the polymer likewise contains tetravalent titanium, preferably, more than 50 mole percent tetravalent titanium relative to trivalent titanium.

The polymers treated in accordance with the invention are less unsaturated than the original polymers. The best mechanical properties are obtained if the polymer treated does not contain any amount of olefinic double bonds measurable by infra-red analysis. What is meant here is that, per 100 carbon atoms, the polymer should contain fewer than 0.01 terminal, fewer than 0.01 lateral, and fewer than 0.01 internal trans-olefinic double carbon bond.

The hydrocarbon polymers treated according to the invention, such as polypropylene, polystyrene, copolymers of ethylene and propylene, etc., are novel substances. They are distinguished from polymers not treated according to the invention in that they do not contain olefinic double bonds in amounts measurable by infra-red analysis. However, some of the polyethylenes treated in accordance with the invention are difficult to distinguish by infra-red analysis from the so-called polymethylene prepared from diazomethane. But those types of polyethylene which have inherent viscosities less than 4 are distinguishable from polyethylene with an inherent viscosity less than 4, in that they have a density ($D_4^{23}$) less than 0.96, measured on a compression-molded plate, in the manufacture of which a cooling rate of about 40° C. per minute was used.

It is remarkable that the inherent viscosity is not, or hardly, changed by the treatment according to the invention, while the density is slightly decreased.

The process according to the invention can also be applied to polymers prepared with the help of chromium oxide, molybdenum oxide or peroxide, etc. It is further possible to fit the process according to the invention into these preparation processes.

It is possible, for instance, to add a Ziegler catalyst to the solution obtained by polymerizing ethylene under the influence of chromium oxide, and to keep the polymer solution at the desired temperature for the desired period.

The invention will be further explained with reference to the following examples. In the experiments described, the elongation at rupture was determined by ASTM test method D 638–56T, 1 in./min., the plate from which the test bar was taken being prepared by compression molding in which a cooling rate of 40° C./min. was observed.

The term "impact strength" denotes the energy uptake in kg./sq. cm. according to DIN standard No. 534,453 (see DIN Taschenbuch, October 21, 1955, p. 251, No. 3.1) as applied to a "Dynstat-Probe" test bar having a thickness of 1.6 mm. This test bar is likewise prepared by compression molding in which a cooling rate of about 40° C. per minute is observed. The number of double carbon bonds was determined by measuring the absorption intensities at 10.3$\mu$ (internal-trans), 11.0$\mu$ (terminal) and 11.25$\mu$ (lateral) in the infra-red spectrum and comparing these with the absorption intensities of model substances containing these double bonds.

EXAMPLE 1

120 grams of a powdery Ziegler polyethylene, having an inherent viscosity of 1.3, an elongation at rupture of 25%, an impact strength of 14, and an unsaturation, in the order of internal, terminal, lateral bonds, of 0.02, 0.06 and 0.02 double bond per 100 carbon atoms, were suspended in 1 litre of heptane. Subsequently, 3 mmoles of diisobutyl aluminum hydride and 22 mmoles of titanium tetrachloride were added to the suspension in the absence of oxygen and water. Next, the suspension was heated at 80° C. for 60 minutes.

After this treatment, and the usual further processing, the polymer had an inherent viscosity of 1.4, an elongation at rupture of 250%, and an unsaturation for all three types of bonds less than 0.01 double bond per 100 carbon atoms. The impact strength had increased to 26, while in the test for determining this property, only slight tearing was observed. By way of comparison, it may be mentioned that a plate of the original product, compression-molded in the same way, cracked upon bending by hand.

The experiment was repeated in the same way with the separate catalyst components, and without any catalyst. In none of these three cases was any improvement of the mechanical properties to be noticed.

EXAMPLE 2

A powdery Ziegler polyethylene having an inherent viscosity of 1.7, an elongation at rupture of 20%, and an impact strength of 17, was treated as described in Example 1, with this difference that the treatment at 80° C. now lasted only 30 minutes. After the treatment, the polymer had an inherent viscosity of 1.7, an elongation at rupture of 300%, and an impact strength of 31.

An amount of the same polymer, which had been treated at 50° C. for 90 minutes under otherwise identical conditions, had an inherent viscosity of 1.7, and elongation at rupture of 150%, and an impact strength of 26.

EXAMPLE 3

A powdery Ziegler polymer having the properties shown in Table I, was treated in the way described in Example 1 (80° C., 60 minutes) with the amounts of $TiCl_4$ and diethyl aluminum chloride (DEAC), or diisobutyl aluminum hydride (DIBAH), mentioned in Table I.

*Table I*

| DEAC, mmoles per litre | DIBAH, mmoles per litre | $TiCl_4$, mmoles per litre | Inherent visc. | Impact strength | Density |
|---|---|---|---|---|---|
| -------- | ------- | -------- | 1.7 | 17 | 0.9482 |
| 6 | ------- | 6 | 1.6 | 22 | 0.9479 |
| 6 | ------- | 12 | 1.7 | 30 | 0.9456 |
| 6 | ------- | 36 | 1.8 | 31 | 0.9460 |
| -------- | 3 | 3 | 1.6 | 20 | 0.9481 |
| -------- | 3 | 6 | 1.6 | 25 | 0.9473 |
| -------- | 3 | 18 | 1.5 | 35 | 0.9449 |

From this table, it is seen that the improvement of the impact strength is greater if an excess of $TiCl_4$ be used in composing the Ziegler catalyst.

EXAMPLE 4

Ethylene was introduced into heptane which contained 3 mmoles of diisobutyl aluminum hydride and 9 mmoles of $TiCl_4$ per litre. The polymerization temperature was maintained at 65° C. The polymerization was stopped by supplying nitrogen into the reaction vessel instead of ethylene. Subsequently, part of the resulting polymer suspension was deactivated with alcohol in the usual way, and further processed. Another portion of the suspension was heated at 80° C. for 15 minutes before being deactivated, and processed in the same way.

The polymer treated in accordance with the invention had an inherent viscosity of 2.0, as against 1.8 for the untreated polymer, an elongation at rupture of 470%, as against 280%, and an impact strength of 34 (no tearing) as against 27 (tearing), a content of double bonds—in the order of internal, terminal, lateral—smaller than 0.01, 0.01, 0.01, as against 0.02, 0.05, 0.04, a density of 0.9464 as against 0.9498, and an induction time in the auto-oxidation at 150° C. of 61 minutes, as against 43 minutes. By "induction time" is to be understood the time elapsing before 100 mg. of polymer takes up 0.2 ml. of oxygen.

EXAMPLE 5

A Ziegler polymerization was carried out in the way described in Example 4, with this difference that the portion of the suspension treated according to the invention was now heated at 90° C. for 5 minutes.

The treated product had an inherent viscosity of 1.6 as against 1.6 for the untreated product, an elongation at rupture of 350%, as against 250%, while the unsaturation for all three types of bonds was smaller than 0.01, as against 0.02, 0.07, 0.03.

EXAMPLE 6

An amount of polypropylene prepared with the help of a Ziegler catalyst was treated in the way described in Example 1.

The inherent viscosity of the treated product was 2.6 (that of the untreated product being 2.5). Here, also a marked improvement in mechanical properties was obtained.

EXAMPLE 7

A copolymer of ethylene and a small amount of butene-1, prepared with the acid of a chromiumoxide catalyst was treated in the way described in Example 1. The treatment caused the density ($D_4^{23}$) to decrease from 0.953 to 0.949 and the impact strength to increase from 22 (tearing) to 34 (no tearing).

EXAMPLE 8

A polyethylene prepared with the acid of a chromiumoxide catalyst was treated as described in Example 1. The treatment caused the density ($D_4^{23}$) to decrease from 0.963 to 0.957 while the mechanical properties were improved.

The expression "dispersion" as used in the appended claims covers both a "solution" and a "suspension."

We claim:

1. Process of preparing polymers having improved mechanical properties by homopolymerizing a substance selected from the group consisting of ethylene, propylene, butene-1 and copolymerizing mixtures of these monomers in a liquid vehicle in the presence of a catalyst containing titanium chloride and an aluminum alkyl compound, comprising the step of treating a dispersion of the said polymer in said liquid vehicle, obtained by said polymerisation, in the substantial absence of monomer, with an amount of said active catalyst at an elevated temperature lower than 100° C. for a period longer than 2 minutes.

2. Process according to claim 1, wherein the treatment takes place at a temperature of 70–90° C. for a period of 4–60 minutes.

3. Process according to claim 1, wherein said titanium chloride component of said catalyst comprises tetravalent titanium.

4. A process for preparing polyethylene having improved mechanical properties by homopolymerizing ethylene in a saturated hydrocarbon liquid vehicle in the presence of a catalyst containing titanium chloride and an aluminum alkyl compound, comprising the step of treating a dispersion of polyethylene in said liquid vehicle obtained by said polymerization in the substantial absence of monomer with an amount of said active catalyst at a temperature to between 60 and 100° C. for more than 2 minutes.

5. A process for preparing polyethylene having improved mechanical properties comprising: homopolymerizing ethylene in a saturated hydrocarbon liquid vehicle in the presence of excess active catalyst comprising trivalent titanium, tetravalent titanium, and an aluminum alkyl compound; and treating the resultant dispersed polyethylene in the absence of substantial amounts of monomer by heating said dispersion of polyethylene in liquid vehicle with the excess amount of active catalyst remaining after polymerization to between 60 and 100° C. for more than two minutes to obtain a final polyethylene product of improved physical properties.

6. A process for preparing polymers having improved physical properties comprising: homopolymerizing a monomer selected from the group consisting of ethylene, propylene, butene-1, and copolymerizing mixtures thereof in a liquid organic vehicle in the presence of excess active catalyst comprising tetravalent titanium and an aluminum alkyl compound; and treating the resultant dispersed polymer in the absence of substantial amounts of monomer by heating said liquid dispersion with the excess amount of active catalyst remaining after polymerization to an elevated temperature no higher than 100° C. for more than 2 minutes to obtain a final polymer product of improved physical properties.

References Cited by the Examiner

UNITED STATES PATENTS

| | | | |
|---|---|---|---|
| 2,372,001 | 3/45 | Joyce | 260—94.9 |
| 2,825,721 | 3/58 | Hogan et al. | 260—94.9 |
| 2,833,755 | 5/58 | Coover | 260—93.7 |
| 2,889,314 | 6/59 | Fritz | 260—94.9 |
| 2,918,461 | 12/59 | Flynn | 260—94.9 |
| 2,921,933 | 1/60 | McKinnis et al. | 260—94.9 |
| 2,924,591 | 2/60 | Roelen | 260—94.9 |
| 2,927,103 | 3/60 | Schneider et al. | 260—88.2 |
| 2,958,687 | 11/60 | Dunham et al. | 260—94.9 |
| 2,967,834 | 1/61 | Daniel et al. | 260—94.9 |
| 2,981,727 | 4/61 | Boeke et al. | 260—94.9 |

OTHER REFERENCES

"Textbook of Polymer Chemistry," by Billmeyer Interscience Publishers, Inc., New York (1957) (pp. 128–129).

JOSEPH L. SCHOFER, *Primary Examiner.*

LESLIE H. GASTON, *Examiner.*

UNITED STATES PATENT OFFICE
CERTIFICATE OF CORRECTION

Patent 3,211,715 October 12, 1965

Hendrik Hendriks et al.

It is hereby certified that error appears in the above numbered patent requiring correction and that the said Letters Patent should read as corrected below.

Column 3, line 4, for "bond" read -- bonds --; same column 3, line 16, for "polyethylene" read -- polymethylene --.

Signed and sealed this 28th day of June 1966.

(SEAL)
Attest:

ERNEST W. SWIDER
Attesting Officer

EDWARD J. BRENNER
Commissioner of Patents